(12) United States Patent
Ye

(10) Patent No.: US 11,430,251 B2
(45) Date of Patent: Aug. 30, 2022

(54) OPTICAL FINGERPRINT IDENTIFICATION ASSEMBLY AND TERMINAL

(71) Applicant: VIVO MOBILE COMMUNICATION CO., LTD., Guangdong (CN)

(72) Inventor: Jinshan Ye, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/953,226

(22) Filed: Nov. 19, 2020

(65) Prior Publication Data

US 2021/0073505 A1 Mar. 11, 2021

Related U.S. Application Data

(63) Continuation of application No. PCT/CN2019/089160, filed on May 30, 2019.

(30) Foreign Application Priority Data

Jun. 8, 2018 (CN) .......................... 201810588494.8

(51) Int. Cl.
*G06V 40/13* (2022.01)
(52) U.S. Cl.
CPC .............................. *G06V 40/1318* (2022.01)
(58) Field of Classification Search
CPC .................................................. G06K 9/0004
See application file for complete search history.

(56) References Cited

U.S. PATENT DOCUMENTS

| | | | |
|---|---|---|---|
| 4,340,300 A | 7/1982 | Ruell | |
| 2009/0016578 A1* | 1/2009 | Yamamoto | G06K 9/00013 382/124 |
| 2009/0116030 A1 | 5/2009 | Bahuguna | |
| 2018/0293420 A1* | 10/2018 | Kim | G06F 1/1626 |
| 2019/0005631 A1* | 1/2019 | Shiga | G06T 5/009 |
| 2019/0012555 A1* | 1/2019 | Bae | G06K 9/2027 |
| 2019/0065845 A1 | 2/2019 | Xu | |
| 2021/0051253 A1* | 2/2021 | Liu | H04N 5/2624 |
| 2021/0073505 A1 | 3/2021 | Ye | |

FOREIGN PATENT DOCUMENTS

| | | |
|---|---|---|
| CN | 202632317 U | 12/2012 |
| CN | 202956773 U | 5/2013 |
| CN | 204288243 U | 4/2015 |
| CN | 205486177 U | 8/2016 |
| CN | 107346152 A | 11/2017 |
| CN | 108875622 A | 11/2018 |
| EP | 3 236 390 A1 | 10/2017 |
| JP | 2004-054131 A | 2/2004 |

(Continued)

OTHER PUBLICATIONS

CN Office Action in Application No. 201810588494.8 dated Dec. 24, 2019.

(Continued)

*Primary Examiner* — Joseph R Haley
(74) *Attorney, Agent, or Firm* — Maschoff Brennan

(57) ABSTRACT

The present disclosure provides an optical fingerprint identification assembly and a terminal. The optical fingerprint identification assembly includes a lens, an image sensor, and a band-pass filter arranged at a light-entering side of the image sensor.

3 Claims, 1 Drawing Sheet

(56) References Cited

FOREIGN PATENT DOCUMENTS

| JP | 2005-309051 A | 11/2005 |
|----|---------------|---------|
| WO | 2015/005959 A1 | 1/2015 |
| WO | 2017/132903 A1 | 8/2017 |

OTHER PUBLICATIONS

Written Opinion and International Search Report in Application No. PCT/CN2019/089160 dated Dec. 17, 2020.
European Search Report issued in corresponding application No. 19816101, dated Jun. 17, 2021.
JP Office Action in Application No. 2020-568259 dated Apr. 4, 2022.
JP Office Action in Application No. 2020-568259 dated Dec. 13, 2021.

* cited by examiner

OPTICAL FINGERPRINT IDENTIFICATION ASSEMBLY AND TERMINAL

CROSS-REFERENCE TO RELATED APPLICATION

The present application a continuation application of International Application No. PCT/CN2019/089160 filed on May 30, 2019, which claims a priority of the Chinese patent application No. 201810588494.8 filed on Jun. 8, 2018, both disclosures of which are incorporated herein by reference in their entireties.

TECHNICAL FIELD

The present disclosure relates to the field of communication technology, in particular to an optical fingerprint identification assembly and a terminal.

BACKGROUND

Along with the rapid development of the terminal technology, terminals have become an indispensable tool in people's lives and have significantly facilitate all aspects of users' lives. In the related art, there already exists an in-screen fingerprint identification technology to facilitate a user's operation and bring a new experience.

An image sensor is arranged under a display panel of the terminal. Light emitted by the display panel is reflected by a finger on the display panel, and then passes through an optical lens and an optical filter toward the image sensor. The image sensors detects a difference between energy of light reflected by a ridge of a fingerprint and energy of light reflected by a valley of the fingerprint, so as to form an image with different grayscale values, i.e., form an original fingerprint image.

However, the light received by the image sensor includes blue light and green light, and there is a relatively large difference between intensity distribution of the blue light and intensity distribution of the green light. Hence, it is difficult to effectively adjust exposure time, thereby the fingerprint image is blurry and a fingerprint identification success rate is relatively low.

SUMMARY

In one aspect, the present disclosure provides in some embodiments an optical fingerprint identification assembly, including a lens, an image sensor, and a band-pass filter arranged at a light-entering side of the image sensor.

In another aspect, the present disclosure provides in some embodiments a terminal, including a display panel and an optical fingerprint identification assembly arranged under the display panel. The display panel is provided with a light-transmitting region for the optical fingerprint identification assembly, and the optical fingerprint identification assembly includes a lens, an image sensor, and a band-pass filter arranged between the display panel and the image sensor.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
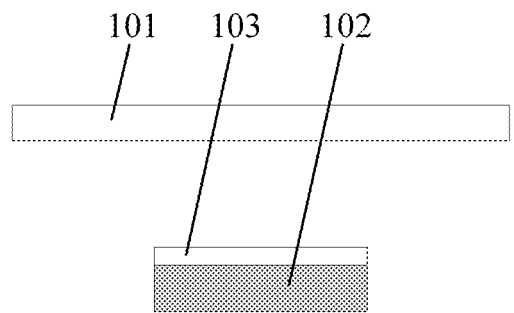
FIG. 1 is a schematic view showing an optical fingerprint identification assembly according to one embodiment of the present disclosure.

FIG. 1 shows an optical fingerprint identification assembly according to one embodiment of the present disclosure. As shown in FIG. 1, the optical fingerprint identification assembly includes a lens 101, an image sensor 102, and a band-pass filter 103 arranged at a light-entering side of the image sensor 102.

In the embodiments of the present disclosure, through the lens 101, the image sensor 102 may receive light in a better manner. The band-pass filter 103 may be a filter which is arranged in such a manner as to merely allow monochromatic light, e.g., blue light or green light, to pass therethrough. When the band-pass filter 103 is arranged at the light-entering side of the image sensor 102, it means that the band-pass filter 103 may be arranged at a side where a sensing surface of the image sensor 102 is located. The band-pass filter 103 may be separated from the sensing surface of the image sensor 102 by a certain distance. When the light entering the band-pass filter 103, it may be filtered by the band-pass filter 103, and then the filtered light may be received by the image senor 102.

It should be appreciated that, when the band-pass filter 103 is arranged at the light-entering side of the image sensor 102, the band-pass filter 103 may be arranged between the lens 101 and the image senor 102, or the lens 101 may be arranged between the band-pass filter 103 and the image sensor 102, which will not be particularly defined herein.

In the related art, blue light and green light, or mixed light consisting of the blue light and the green light, are left after the filtration by the filter. Generally speaking, in a light response curve of the image sensor 102, a wave band of visible light is relatively large. During the induction-based imaging, there is a relatively large difference between intensity distribution of the blue light and intensity distribution of the green light, so it is difficult to adjust exposure time effectively. For example, when certain exposure time is selected, usually there is such a circumstance where overexposure occurs for a blue pixel region and insufficient signal intensity occurs for a green pixel region. Such a situation finally results in a non-uniform and blurry fingerprint image. Hence, a fingerprint identification success rate is relatively low.

However, according to the optical fingerprint identification assembly in the embodiments of the present disclosure, due to the band-pass filter 103 arranged at the light-entering side of the image sensor 102, merely the monochromatic light may be allowed to pass through the band-pass filter 103, so it is able to prevent light other than the monochromatic light from interfering with the image sensor 102. As a result, it is able to adjust exposure time for the monochromatic light, thereby to provide a clear fingerprint image and increase the fingerprint identification success rate.

In addition, due to the existence of the band-pass filter 103, a display panel may be provided with any light source, so as to meet user's design requirements on various colors, i.e., display mixed light at a fingerprint identification region of a screen in accordance with a design requirement. In this way, it is able to meet the individual requirements of different users, thereby to provide the display panel of a mobile terminal with display modes in a more diversified manner.

In the embodiments of the present disclosure, the terminal may be a mobile phone, a tablet personal computer, a laptop computer, a personal digital assistant (PDA), a mobile Internet device (MID) or a wearable device.

In a possible embodiment of the present disclosure, the band-pass filter 103 may be arranged between the lens 101 and the image sensor 102.

In the embodiments of the present disclosure, when the band-pass filter 103 is arranged between the lens 101 and the image sensor 102, it is able to filter the light passing through the lens 101. In addition, the lens 101 may be a convex lens, so as to converge the light. In this way, it is able to provide the band-pass filter 103 with a relatively small area, as long as the band-pass filter 103 is capable of receiving and filtering the converged light, thereby to reduce the manufacture cost of the band-pass filter 103.

In a possible embodiment of the present disclosure, the band-pass filter 103 may be arranged on, and attached to, the image sensor 102.

In the embodiments of the present disclosure, when the band-pass filter 103 is arranged on, and attached to, the image sensor 102, it is able to support and secure the band-pass filter 103 directly through the image sensor 102. The band-pass filter 103 may be adhered to the image sensor 102 at adhesive-dispensing positions, or fastened into the image sensor 102 through a buckle, which will not be particularly defined herein.

In a possible embodiment of the present disclosure, the light allowed to pass through the band-pass filter 103 may be monochromatic light.

In the embodiments of the present disclosure, the monochromatic light may be allowed to pass through the band-pass filter 103, so as to prevent the light other than the monochromatic light from interfering with the image sensor 102. As a result, it is able to adjust the exposure time for the monochromatic light, thereby to provide a clear fingerprint image and increase the fingerprint identification success rate.

In a possible embodiment of the present disclosure, the monochromatic light may be blue light or green light.

In the embodiments of the present disclosure, a wavelength of the light allowed to pass through the band-pass filter 103 may be within a range of 455 nm to 492 nm, i.e., the blue light may be allowed to pass through the band-pass filter 103. After mixed light is emitted by the display panel, reflected visible light is filtered by the band-pass filter 103 and merely the blue light is allowed to pass therethrough, so it is able to prevent the occurrence of the blurry fingerprint image caused when it is difficult to adjust the exposure time of multispectral light due to a difference in the leakage light intensities, thereby to increase the fingerprint identification success rate.

Alternatively, the wavelength of the light allowed to pass through the band-pass filter 103 may be within a range of 492 nm to 577 nm, i.e., the green light may be allowed to pass through the band-pass filter 103. After the mixed light is emitted by the display panel, reflected visible light is filtered by the band-pass filter 103 and merely the green light is allowed to pass therethrough, so it is able to prevent the occurrence of the blurry fingerprint image caused when it is difficult to adjust the exposure time of multispectral light due to a difference in the leakage light intensities, thereby to increase the fingerprint identification success rate.

In a possible embodiment of the present disclosure, a wavelength of the light allowed to pass through the band-pass filter 103 may be within a range acquired by adding a predetermined margin to a wavelength range of the monochromatic light.

In the embodiments of the present disclosure, the predetermined margin may be an appropriate value determined through multiple experiments, and the monochromatic light in different colors may correspond to different margins or a same margin. Considering a non-steepening effect of a wavelength cut-off frequency of the monochromatic light (the blue light or green light), a certain margin may be provided.

For example, when the light allowed to pass through the band-pass filter 103 is the blue light having a wavelength within the range of 455 nm to 492 nm, the wavelength of the light allowed to pass through the band-pass filter 103 may be within a range of 430 nm to 510 nm, which is acquired through adding the predetermined margin to the range of 455 nm to 492 nm. Alternatively, when the light allowed to pass through the band-pass filter 103 is the green light having a wavelength within the range of 492 nm to 577 nm, the wavelength of the light allowed to pass through the band-pass filter 103 may be within a range of 470 nm to 590 nm, which is acquired through adding the predetermined margin to the range of 492 nm to 577 nm.

According to the embodiments of the present disclosure, the optical fingerprint identification assembly may include the lens 101, the image sensor 102, and the band-pass filter 103 arranged at the light-entering side of the image sensor 102. The band-pass filter 103 may be arranged in such a manner as to merely allow the monochromatic light to pass therethrough, so as to prevent the light other than the monochromatic light from interfering with the image senor 102. As a result, it is able to adjust the exposure time for the monochromatic light, thereby to provide a clear fingerprint image and increase the fingerprint identification success rate.

Figure 2:
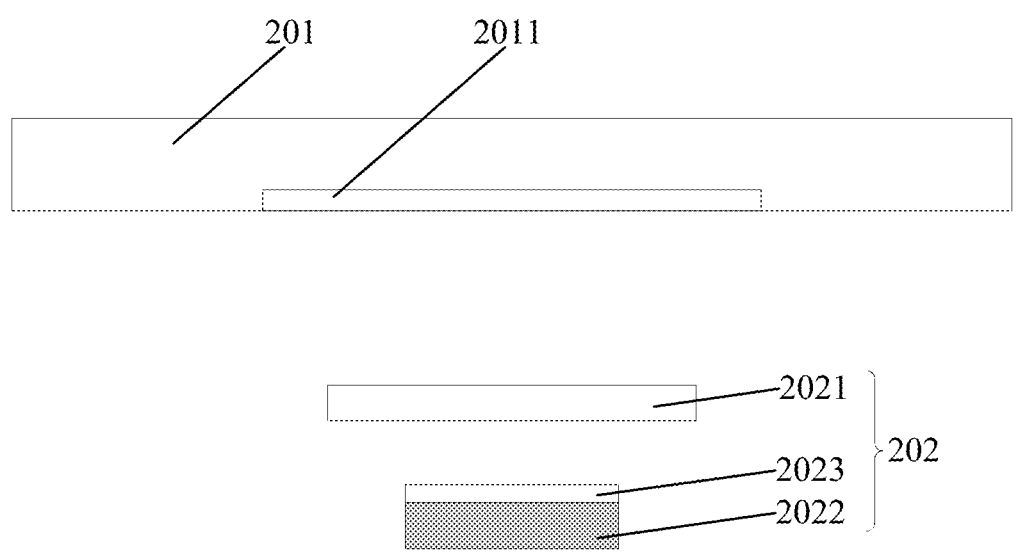
FIG. 2 is a schematic view showing a terminal according to one embodiment of the present disclosure.

FIG. 2 is a schematic view showing a terminal according to one embodiment of the present disclosure. As shown in FIG. 2, the terminal includes a display panel 201 and an optical fingerprint identification assembly 202 arranged under the display panel 201. The display panel 201 is provided with a light-transmitting region 2011 for the optical fingerprint identification assembly, and the optical fingerprint identification assembly 202 includes a lens 2021, an image sensor 2022, and a band-pass filter 2023 arranged between the display panel 201 and the image sensor 2022.

In the embodiments of the present disclosure, the display panel 201 may be a liquid crystal display panel, or an organic light-emitting diode (OLED) display panel. The light-transmitting region 2011 may be a circular or rectangular region. The light-transmitting region 2011 may be of any other shape, which will not be particularly defined herein.

In the embodiments of the present disclosure, due to the existence of the light-transmitting region 2011, light may pass through the light-transmitting region 2011 to the image sensor 2022. The band-pass filter 2023 may be arranged between the display panel 201 and the image sensor 2022, so it is able to prevent light other than monochromatic light from interfering with the image sensor 2022. As a result, it is able to adjust exposure time for the monochromatic light, thereby to provide a clear fingerprint image and increase the fingerprint identification success rate.

In a possible embodiment of the present disclosure, the display panel 201 may be an OLED display panel.

In the embodiments of the present disclosure, when the display panel 201 is the OLED display panel, due to the existence of the band-pass filter 2023, it is able to increase the fingerprint identification success rate of the OLED display panel.

It should be appreciated that, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The description has been given hereinabove in conjunction with the drawings and the embodiments, but the present disclosure shall not be limited to the above specific embodiments. These embodiments are for illustrative purposes only, but shall not be used to limit the scope of the present disclosure. A person skilled in the art may make various alternations or modifications without departing from the spirit of the present disclosure and the scope defined in the appended claims, which also fall within the scope of the present disclosure.

What is claimed is:

1. A terminal, comprising a display panel and an optical fingerprint identification assembly arranged under the display panel, wherein the display panel is provided with a light-transmitting region for the optical fingerprint identification assembly, and the optical fingerprint identification assembly comprises a lens, an image sensor, and a band-pass filter arranged at a light-entering side of the image sensor;

wherein light allowed to pass through the band-pass filter is monochromatic light, and the monochromatic light is blue light;

wherein a color of mixed light passing through a fingerprint identification region of a screen of the display panel is a mix of red, green and blue when the terminal operates to recognize the object; wherein the mixed light passing through the fingerprint identification region is provided by the display panel which includes a blue pixel, a green pixel and a red pixel each of which is on;

wherein an orthogonal projection of the lens onto a same plane perpendicular to a direction from the lens to the band-pass filter is larger than an orthogonal projection of the band-pass filter onto the same plane;

wherein the band-pass filter is arranged between the lens and the image sensor, and the band-pass filter is arranged on, and attached to, the image sensor;

wherein the band-pass filter is adhered to the image sensor at adhesive-dispensing positions, or, the band-pass filter is fastened into the image sensor through a buckle.

2. The terminal according to claim 1, wherein the display panel is an Organic Light-Emitting Diode (OLED) display panel.

3. The terminal according to claim 1, wherein a wavelength of the light allowed to pass through the band-pass filter is within a range acquired through adding a predetermined margin to a wavelength range of the monochromatic light.

* * * * *